(12) United States Patent
Eguchi et al.

(10) Patent No.: US 6,406,402 B1
(45) Date of Patent: Jun. 18, 2002

(54) APPARATUS FOR CONTROLLING PULLEY SIDE-PRESSURE OF CONTINUOUSLY VARIABLE TRANSMISSION IN VEHICLE HAVING FUNCTION OF STOPPING ENGINE IDLING

(75) Inventors: Takahiro Eguchi; Akihira Aoki, both of Tochiqi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 10 days.

(21) Appl. No.: 09/619,761

(22) Filed: Jul. 19, 2000

(30) Foreign Application Priority Data

Jul. 21, 1999 (JP) .......................... 11-206436
Apr. 10, 2000 (JP) ....................... 2000-107970

(51) Int. Cl.[7] .............................. B60R 41/12
(52) U.S. Cl. ........................ 477/45; 477/50; 477/39; 474/28
(58) Field of Search ................... 477/45, 50, 167, 477/168, 176, 178; 474/23, 28

(56) References Cited

U.S. PATENT DOCUMENTS 5,609,543 A * 3/1997 Aoki et al. .................. 477/45
5,713,815 A * 2/1998 Funatsu et al. .............. 477/46
5,776,028 A * 7/1998 Matsuda et al. ............. 477/45
5,916,061 A * 6/1999 Koyama et al. ............ 477/175

* cited by examiner

Primary Examiner—Sherry Estremsky
Assistant Examiner—Tisha D. Lewis
(74) Attorney, Agent, or Firm—Armstrong, Westerman & Hattori, LLP

(57) ABSTRACT

In an apparatus for controlling a pulley side-pressure of a belt type continuously variable transmission mechanism provided, in series with a starting clutch, in a transmission of a vehicle having a function of stopping engine idling so that an engine is automatically stopped, if the vehicle start-up is controlled from the state of engine stopping in an ordinary way in which the pulley side-pressure is determined by that belt transmission torque corresponding to an output torque of the engine which is obtained by the rotational speed and the negative suction pressure of the engine, the pulley side-pressure becomes excessive by wrong judgement that the engine output torque is large, because the negative suction pressure is small at the beginning of the engine starting. The durability then deteriorates and the specific fuel consumption becomes poor. As a solution, at a vehicle start-up from the state of engine stopping, a belt transmission torque corresponding to that transmission torque of the starting clutch which is obtained by the engaging force of the starting clutch is compared with a belt transmission torque corresponding to the engine output. The pulley side-pressure is each controlled based on that transmission torque of the drive pulley corresponding to the smaller belt transmission torque and on the transmission torque of the driven pulley.

4 Claims, 5 Drawing Sheets

APPARATUS FOR CONTROLLING PULLEY SIDE-PRESSURE OF CONTINUOUSLY VARIABLE TRANSMISSION IN VEHICLE HAVING FUNCTION OF STOPPING ENGINE IDLING

BACKGROUND OF THE INVENTION

1. Field of the Invention

The present invention relates to an apparatus for controlling a pulley side-pressure to be applied to a drive pulley and a driven pulley of a belt type continuously variable transmission mechanism which is provided, in series with a starting clutch, in a transmission of a vehicle having a function of stopping engine idling so that an engine is automatically stopped under given conditions when the vehicle is at a standstill.

2. Description of Related Art

Conventionally, the pulley side-pressures to be applied to a drive pulley and a driven pulley of a belt type continuously variable transmission are controlled based on a belt transmission torque which corresponds to an output torque of an engine, the control being made such that slip does not occur to a belt. The output torque of the engine is calculated from the rotational speed and a negative suction pressure of the engine.

In a vehicle having a function of stopping engine idling, at the time of vehicle start-up from the state of engine stopping, the engine is started from a state in which the negative suction pressure has not been generated. Therefore, until the rotational speed of the engine increases to a certain degree and the negative suction pressure consequently becomes large enough, the engine output torque which is calculated from the rotational speed of the engine and the negative suction pressure becomes larger than an actual value. As a result, the pulley side-pressure becomes excessive, and the durability of the pulleys and the belt is badly affected. Further, a friction loss becomes large at a point of the belt's coming into contact with the pulley and a point of the belt's going out of contact with the pulley, resulting in a bad effect on the specific fuel consumption.

In view of the above points, the present invention has an object of providing an apparatus for controlling a pulley side-pressure in which the pulley side-pressure can be prevented from becoming excessive at the time of vehicle start-up from the state of engine stopping.

SUMMARY OF THE INVENTION

In order to attain the above and other objects, the present invention is an apparatus for controlling a pulley side-pressure to be applied to a drive pulley and a driven pulley of a belt type continuously variable transmission mechanism which is provided, in series with a starting clutch, in a transmission of a vehicle having a function of stopping engine idling so that an engine is automatically stopped under given conditions when the vehicle is at a standstill. The apparatus comprises: means for calculating a first belt transmission torque which corresponds to that output torque of the engine which is obtained from a rotational speed and a negative suction pressure of the engine; means for calculating a second belt transmission torque which corresponds to that transmission torque of the starting clutch which is obtained from an engaging force of the starting clutch; and means for controlling a pulley side-pressure based on whichever is smaller between the first and second belt transmission torques at a time of vehicle start-up from a state of engine stopping.

Even if the output torque of the engine is large, the belt transmission torque, i.e., the transmission torque of the continuously variable transmission mechanism will not become larger than the transmitting toque of the starting clutch. Therefore, even if the pulley side-pressure is controlled based on whichever is smaller between the first belt transmission torque corresponding to the engine output torque and the second belt transmission torque corresponding to the transmission torque of the starting clutch, belt slipping does not occur.

According to the present invention, even if that output torque of the engine which is calculated by the rotating speed and the negative suction pressure of the engine becomes larger than the actual value, the pulley side-pressure is controlled to a value corresponding to the transmission torque of the starting clutch. The pulley side-pressure can thus be prevented from becoming excessive.

The friction coefficient of a clutch disc of the starting clutch varies from clutch to clutch and further varies or deteriorates with the lapse of time. Therefore, the actual transmission torque of the starting clutch sometimes exceeds an ordinary transmission torque which is obtained by the engaging force. In such a case, if the pulley side-pressure is controlled to a value corresponding to the ordinary transmission torque, the belt gives rise to slipping. Therefore, the transmission torque of the starting clutch to be obtained by the engaging force of the starting clutch shall be set to a value obtained by multiplying an ordinary transmission torque of the starting clutch (7) by a predetermined safety factor. As a result, if the pulley side-pressure is controlled based only on the transmission torque of the starting clutch, the pulley side-pressure sometimes becomes excessive as compared with the actual belt transmission torque. As a solution, in the present invention, when the belt transmission torque corresponding to the output torque of the engine is smaller than the belt transmission torque corresponding to the transmission torque of the starting clutch, the pulley side-pressure is controlled by the belt transmission torque corresponding to the output torque of the engine.

In case the starting clutch is disposed on the output side of the belt type continuously variable transmission mechanism, there is transmitted a torque to the starting clutch, the torque being of a value obtained by multiplying the input torque (belt transmission torque) of the continuously variable transmission mechanism by the reduction ratio of the continuously variable transmission mechanism. Therefore, the belt transmission torque becomes a value which is obtained by dividing the transmission torque of the starting clutch by the reduction ratio of the continuously variable transmission. However, at the time of vehicle start-up from the state of the engine stopping, the belt transmission torque is partly used or consumed for rotating the stationary driven pulley. The torque to be transmitted to the starting clutch is thus reduced by the above-described amount of consumption. Therefore, preferably, the second belt transmission torque is set to a value which is obtained by adding a first value and a second value together wherein the first value is that transmission torque of the starting clutch which is obtained from the engaging force of the starting clutch as divided by a reduction ratio of the belt type continuously variable transmission and the second value is that torque corresponding to an inertia of the driven pulley which is required to rotate the stationary driven pulley.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
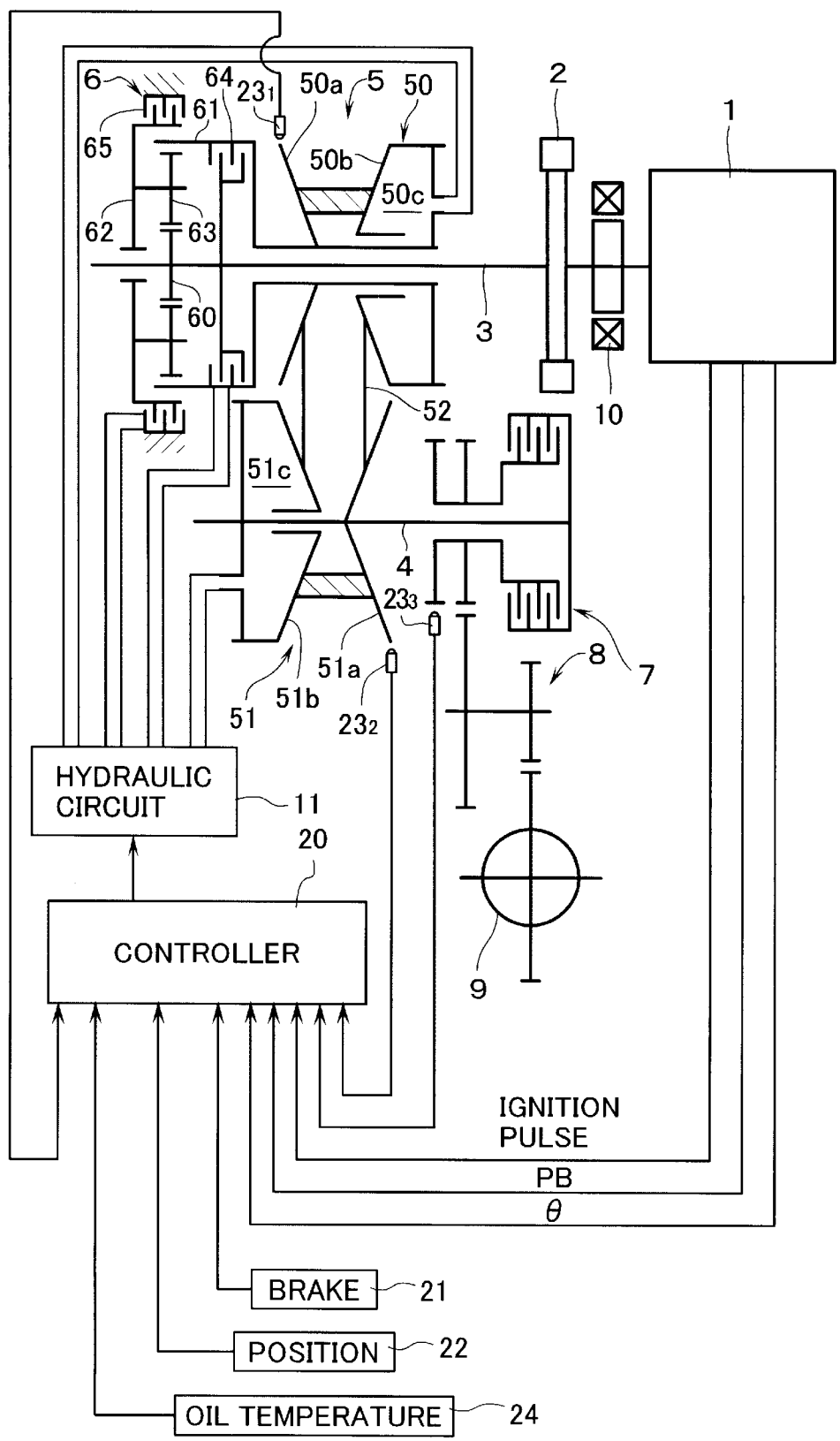
FIG. 1 is a skeleton diagram showing one example of a transmission which is provided with a continuously variable transmission which is to be controlled by the present invention.

FIG. 1 shows a transmission of a vehicle such as a motor vehicle. This transmission is made up of: a belt-type continuously (or steplessly) variable transmission mechanism 5 which is disposed between an output shaft 4 and an input shaft 3 to be connected to an engine 1 through a coupling mechanism 2; a switching mechanism 6 which switches between forward running and reverse running (hereinafter called forward/reverse switching mechanism 6) disposed on an input side of the continuously variable transmission mechanism 5; and a starting clutch 7 which is made up of a hydraulic clutch disposed on an output side of the continuously variable transmission mechanism 5.

The continuously variable transmission mechanism 5 is made up of: a drive pulley 50 which is rotatably supported on the input shaft 3; a driven pulley 51 which is connected to the output shaft 4 so as not to rotate relative to the output shaft 4; and a metallic V-belt 52 which is wound around both the pulleys 50, 51. Each of the pulleys 50, 51 is made up of: a fixed flange 50a, 51a; a movable flange 50b, 51b which is axially movable relative to the fixed flange 50a, 51a; and a cylinder 50c, 51c which urges or pushes the movable flange 50b, 51b toward the fixed flange 50a, 51a. By adequately controlling the pressure of hydraulic oil to be supplied to the cylinder 50c, 51c of each of the pulleys 50, 51, there is generated an adequate pulley side-pressure which does not give rise to the slipping of the V-belt 52. Also, by varying the pulley width of both the pulleys 50, 51, the diameter of winding the V-belt 52 on the pulleys 50, 51 is varied, whereby continuously variable speed changing is provided.

The forward/reverse switching mechanism 6 is constituted by a planetary gear mechanism which is made up of: a sun gear 60 which is connected to the input shaft 3; a ring gear 61 which is connected to the drive pulley 50; a carrier 62 which is rotatably supported by the input shaft 1; a planetary gear 63 which is rotatably supported by the carrier 62 and which is meshed with the sun gear 60 and the ring gear 61; a forward running clutch 64 which is capable of connecting the input shaft 3 and the ring gear 61; and a reverse running brake 65 which is capable of fixing the carrier 62. When the forward running clutch 64 is engaged, the ring gear 61 rotates together with the input shaft 3, and the drive pulley 50 is rotated in the same direction as the input shaft 3 (i.e., forward running direction). When the reverse running brake 65 is engaged, on the other hand, the ring gear 61 is rotated in a direction opposite to that of the sun gear 60, and the drive pulley 50 is driven in a direction opposite to that of the input shaft 3 (i.e., in the reverse running direction). When both the forward running clutch 64 and the reverse running brake 65 are released, the power transmission through the forward/reverse switching mechanism 6 is interrupted.

The starting clutch 7 is connected to the output shaft 4. When the starting clutch 7 is engaged, the output of the engine whose speed has been changed by the continuously variable transmission mechanism 5 is transmitted to a differential 9 through gear trains 8 on the output side of the starting clutch 7, whereby the driving force is transmitted to the left and right driving wheels (not illustrated) of the vehicle from the differential 9. When the starting clutch 7 is released, the power transmission does not take place, and the transmission becomes a neutral state.

In addition, an electric motor 10 is directly connected to the engine 1. The electric motor 10 performs power assisting at the time of acceleration, or the like, recovering of energy at the time of deceleration, and starting of the engine 1. While the vehicle is at a standstill, the engine 1 is automatically stopped if some given conditions are satisfied, e.g.: that the brake is on; that an air conditioner is switched off; and a brake booster negative pressure is above a predetermined value; or the like. If the brake is subsequently off, the engine 1 is started by the electric motor 10, whereby the vehicle is started up from the state of the engine stopping.

Figure 2:
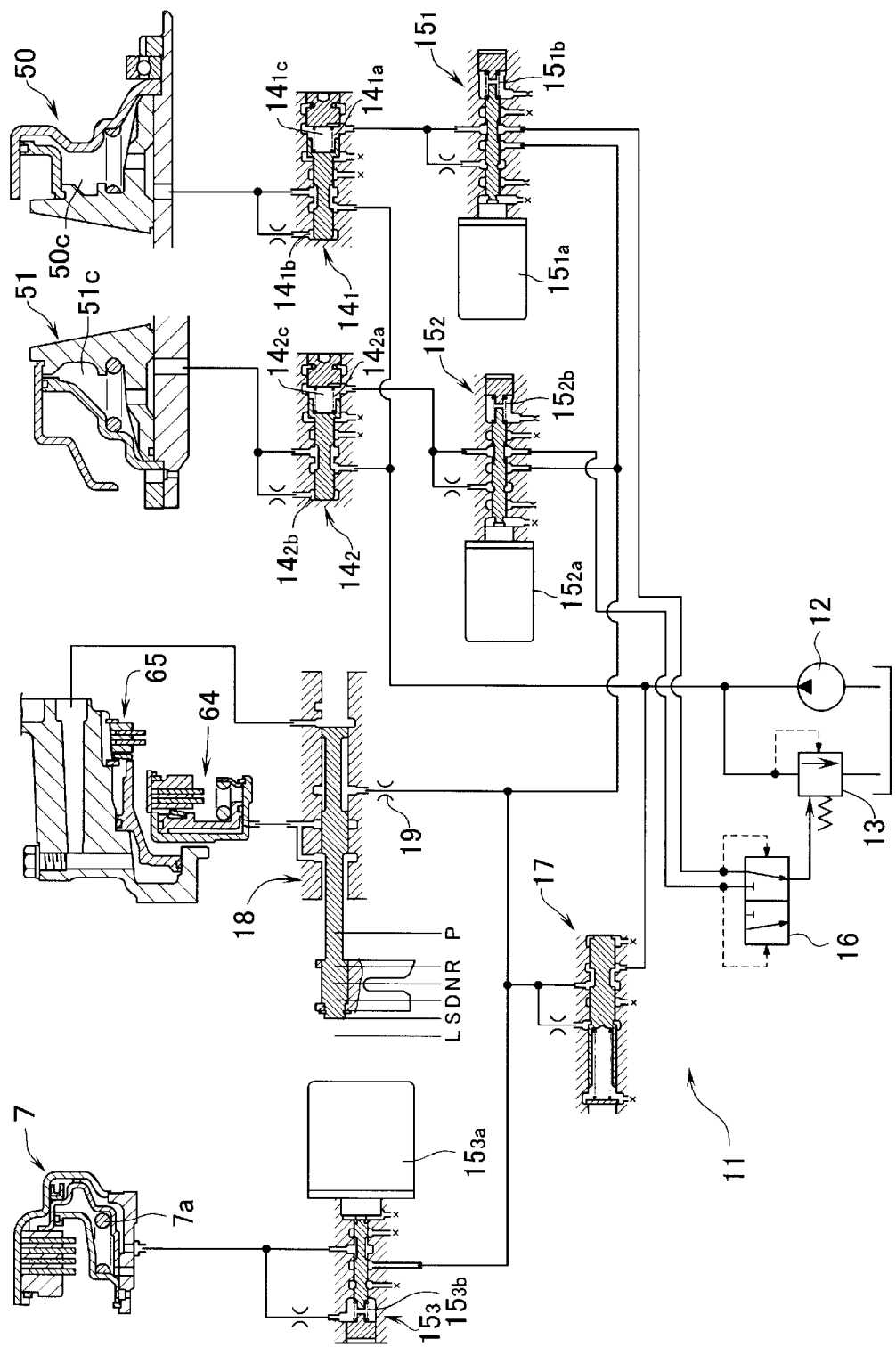
FIG. 2 is a diagram showing the hydraulic circuit of the transmission in FIG. 1.

The hydraulic oil pressures in the cylinder 50c, 51c of each of the pulleys 50, 51 of the continuously variable transmission mechanism 5, in the forward running clutch 64, in the reverse running brake 65 and in the starting clutch 7 are controlled by a hydraulic circuit 11. As shown in FIG. 2, the hydraulic circuit 11 is provided with a hydraulic oil pump 12 which is driven by the engine 1. The delivery pressure from this hydraulic oil pump 12 is regulated by a regulator 13 to a predetermined line pressure. The hydraulic oil pressures (pulley side-pressure) in each of the cylinders 50c, 51c of the drive pulley 50 and the driven pulley 51 can be regulated by each of the first and second pressure regulating valves $14_1$, $14_2$ with the line pressure serving as a base pressure. Each of the first and second pressure regulating valves $14_1$, $14_2$ is urged by a spring $14_{1a}$, $14_{2a}$ toward the leftward open position, and is urged by the pulley side-pressure to be inputted into a left end oil chamber $14_{1b}$, $14_{2b}$ toward the rightward closed position. Further, there are provided a first linear solenoid valve $15_1$ for the first pressure regulating valve $14_1$ and a second linear solenoid valve $15_2$ for the second pressure regulating valve $14_2$. An output pressure from each of the first and second linear solenoid valves $15_1$, $15_2$ is inputted into a right end oil chamber $14_{1c}$, $14_{2c}$ of each of the pressure regulating valves $14_1$, $14_2$. In this manner it is arranged that each of the pulley side-pressures in the drive pulley 50 and the driven pulley 51 can be controlled by each of the first and second linear solenoid valves $15_1$, $15_2$. The output pressure which is the higher pressure between the output pressures of the first and second linear solenoid valves $15_1$, $15_2$ is inputted into the regulator 13 through a changeover valve 16. By controlling the line pressure by this output pressure, an appropriate pulley side-pressure which does not give rise to slipping of the belt 52 is generated. Each of the first and second linear solenoid valves $15_1$, $15_2$ is urged toward the leftward open position by a spring $15_{1b}$, $15_{2b}$ and is also urged toward the rightward closed position by its own output pressure and an electromagnetic force of a solenoid $15_{1a}$, $15_{2a}$. With a modulator pressure (a pressure which is lower than the line pressure by a certain value) from a modulator valve 17 serving as a basic pressure, a hydraulic oil pressure in inverse proportion to the value of an electric current charged to the solenoid $15_{1a}$, $15_{2a}$ is outputted.

To the starting clutch 7, there is connected an oil passage which supplies the modulator pressure, and a third linear solenoid valve $15_3$ is interposed in this oil passage. The third linear solenoid valve $15_3$ is urged toward the rightward closed position by a spring $15_{3b}$, and the hydraulic oil pressure of the starting clutch and is also urged toward the leftward open position by an electromagnetic force of the solenoid $15_{3a}$. In this manner, the hydraulic oil pressure of the starting clutch 7 varies in proportion to the value of the electric current charged to the solenoid $15_{3a}$ with the modulator pressure as the basic pressure.

It is so arranged that the modulator pressure is inputted into the forward running clutch 64 and the reverse running brake 65 through the manual valve 18. The manual valve 18 can be switched into the following five positions in a manner interlocked with a selector lever (not illustrated): i.e., "P" position for parking; "R" position for reverse running; "N" position for neutral state; "D" position for ordinary running; "S" position for sporty running; and "L" position for low-speed holding. In each of the "D", "S" and "L" positions, the modulator pressure is supplied to the forward running clutch 64. In the "R" position, the modulator pressure is supplied to the reverse running brake 65. In each of the "N" and "P" positions, the supply of the modulator pressure to both the forward running clutch 64 and the reverse running brake 65 is stopped. To the manual valve 18, the modulator pressure is supplied through an orifice 19.

Each of the first through third linear solenoid valves $15_1$, $15_2$, $15_3$ is controlled by a controller 20 (see FIG. 1) which is made up of an onboard (a vehicle-mounted) computer. The controller 20 receives the inputs of the following: i.e., the ignition pulses of the engine 1, signals indicating a negative suction pressure PB of the engine 1, and the throttle opening degree $\theta$; a signal from a brake switch 21 which detects the degree or amount of depression of a brake pedal; a signal from a position sensor 22 which detects a selected position of the selector lever; a signal from a speed sensor $23_1$, which detects a rotational speed, or a rotational frequency, of the drive pulley 50; a signal from a speed sensor $23_2$ which detects the rotational speed of the driven pulley 51; a signal from a speed sensor $23_3$ which detects the rotational speed on the output side of the starting clutch 7, i.e., the vehicle speed; and a signal from an oil temperature sensor 24 which detects the temperature of an oil in the transmission. Based on these signals, the controller 20 controls the first through third linear solenoid valves $15_1$, $15_2$, $15_3$.

Figure 3:
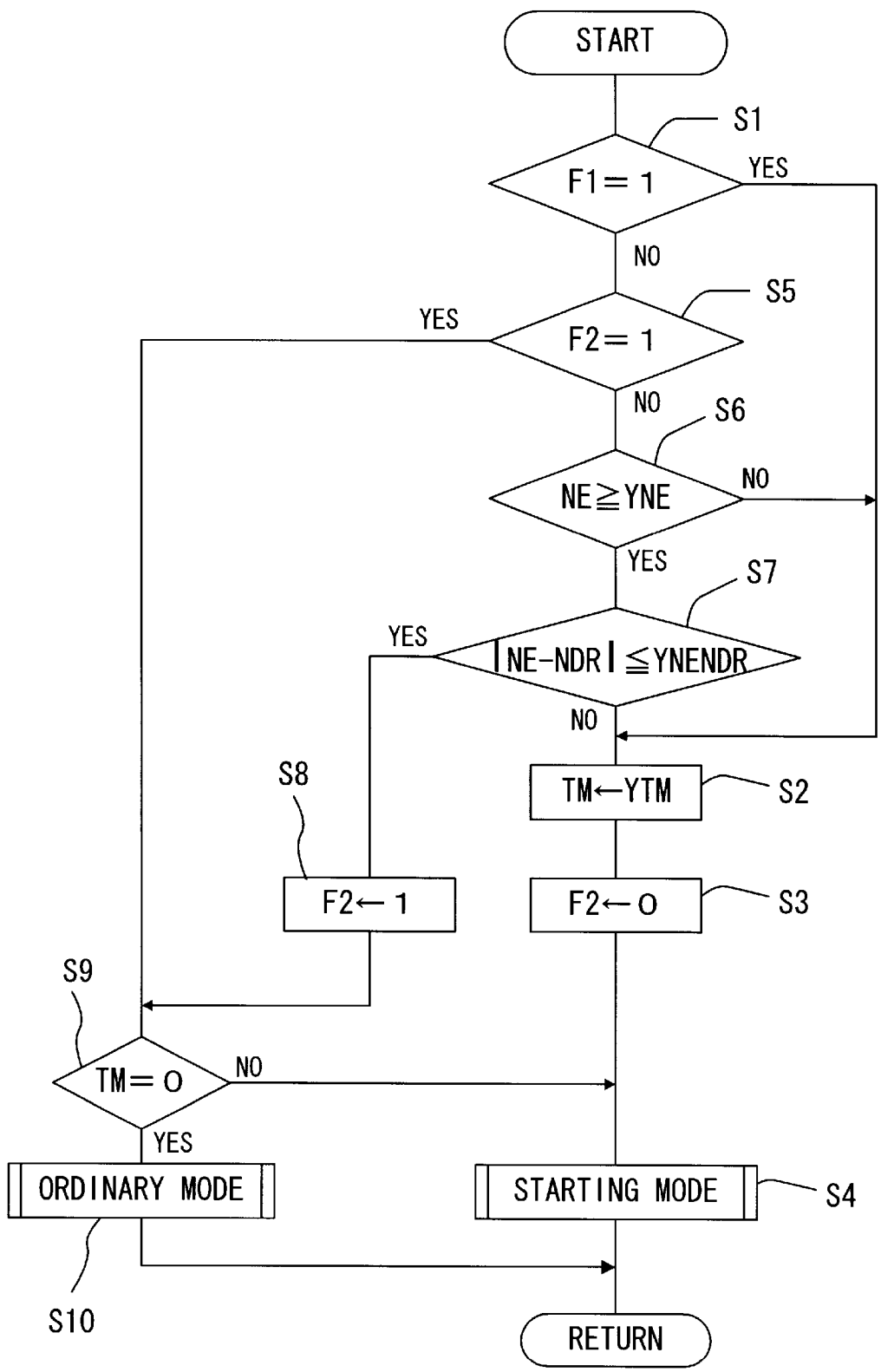
FIG. 3 is a flow chart showing a program for an overall control of the pulley side-pressure.

An explanation will now be made about the control of the pulley side-pressure with reference to FIG. 3. First, at step S1, a discrimination is made as to whether a flag F1 is set to 1 or not. At the time of vehicle start-up from the state of engine stopping, the flag F1 is set to "1" during the time of engine starting and is reset to "0" after completion of the engine starting. At an initial time of vehicle start-up, a discrimination of F1=1 is made. The program thus proceeds to step S2, where the remaining time TM in a subtraction type of timer is set to a predetermined time YTM. Thereafter, at step S3, a flag F2 is reset to "0" and the program, then, proceeds to step S4, where a control of the pulley side-pressure in a starting mode is performed.

When a condition of F1=0 has been satisfied after the completion of starting of the engine 1, a discrimination is made at step S5 as to whether a flag F2 is set to "1" or not. Since the condition of F2=0 has been satisfied initially after the completion of the starting, the program proceeds to step S6, where a discrimination is made as to whether the rotational speed NE of the engine calculated by a difference in time of inputting the ignition pulses of the engine 1 has become above a predetermined speed YNE or not. If NE≧YNE, a discrimination is made at step S7 as to whether an absolute value of deviation between the rotational speed NE of the engine and the rotational speed NDR of the drive pulley 50 has become a predetermined value YNENDR or not. The drive pulley 50 starts to rotate when, as a result of a rise in the hydraulic oil pressure in the hydraulic circuit 11 after starting of the engine 1, the forward running clutch 64 and the reverse running brake 65 are supplied with hydraulic oil, whereby the power transmission is started through the forward/reverse switching mechanism 6. When a condition of |NE−NDR|≦YNENDR has been satisfied, a discrimination is made that an in-gear state in which the forward/reverse switching mechanism 6 transmits the power has been established. Then, at step S8, a flag F2 is set to "1" and the program thereafter proceeds to step S9. From the next time, the program proceeds from step S5 directly to step S9. At step S9, a discrimination is made as to whether the remaining time in the above-described subtraction type of timer TM has become zero or not, i.e., as to whether the time of lapse from the point of time of discrimination of the in-gear state of the forward/reverse switching mechanism 6. If TM≠0, the program proceeds to step S4 to continue the control in the starting mode. When a condition of TM=0 has been satisfied, the program proceeds to step S-10, where a control of the pulley side-pressure in an ordinary mode is performed. In the ordinary mode, the output torque of the engine 1 is calculated from the rotational speed NE and the negative suction pressure PB of the engine 1. Based on the belt transmission torque corresponding to this output torque, the pulley side-pressure is controlled so that slipping does not occur to the belt.

Figure 4:
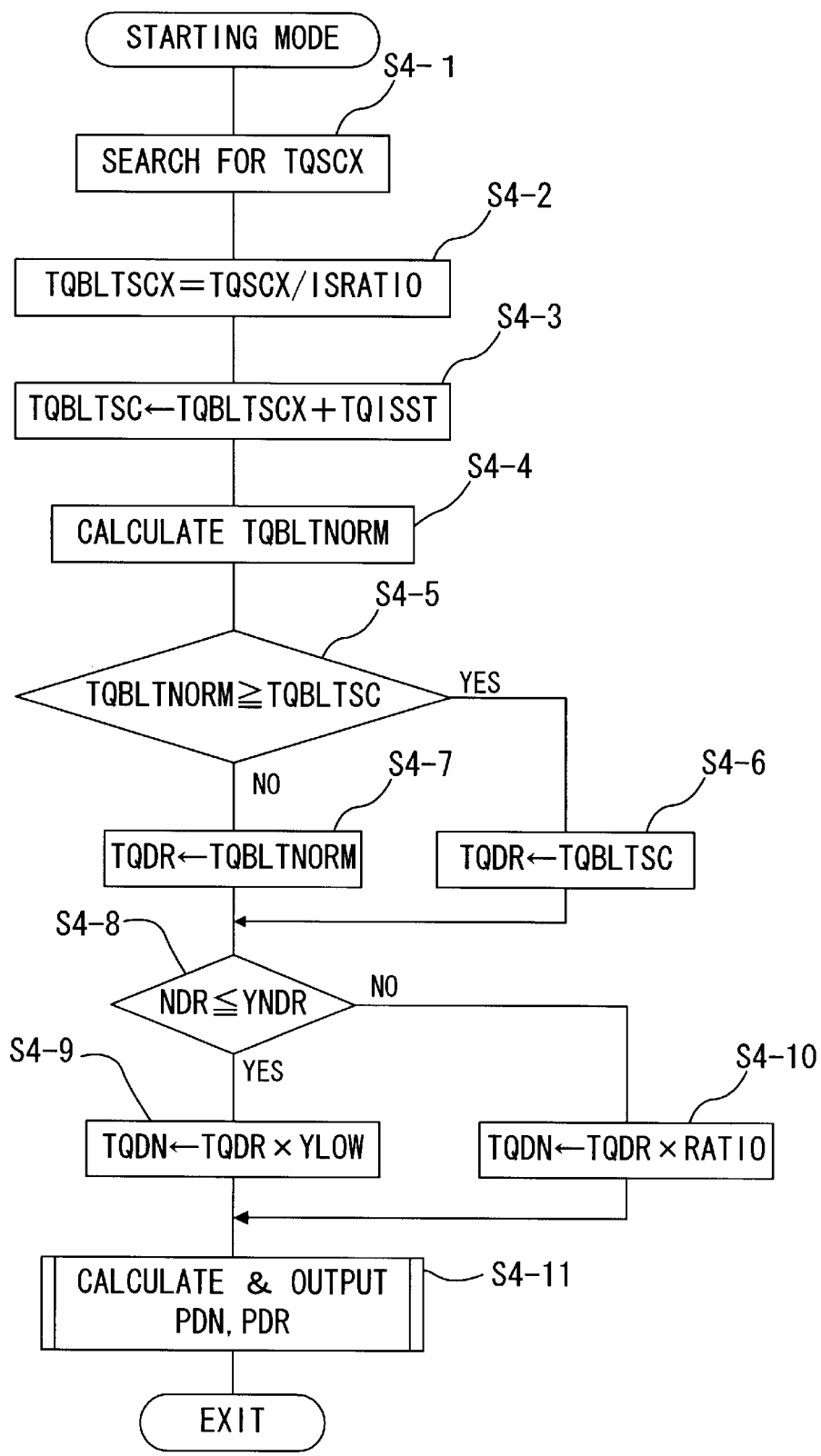
FIG. 4 is a flow chart showing a program for a control of the pulley side-pressure in a starting mode.
Figure 5:
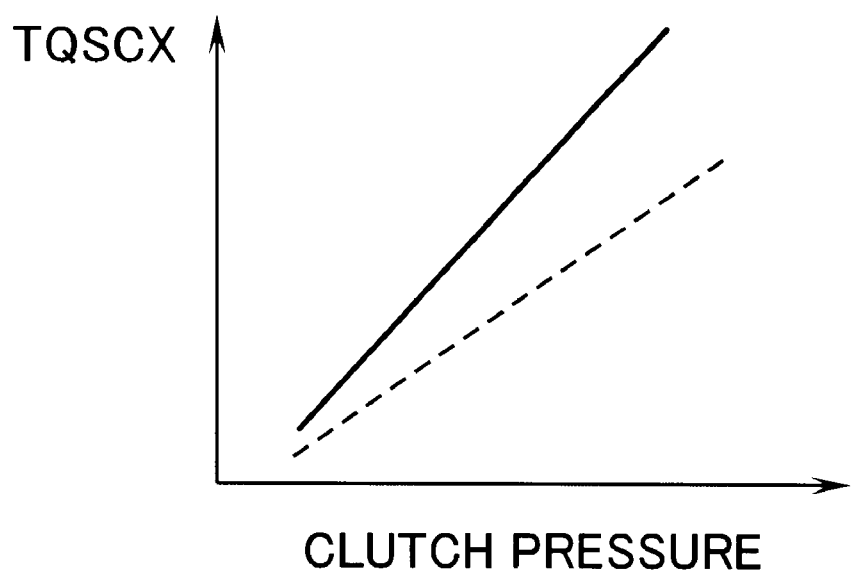
FIG. 5 is a graph showing data table of a transmission torque of the starting clutch.

In the starting mode, as shown in FIG. 4, the transmission torque TQSCX of the starting clutch 7 is searched at step S4-1. TQSCX is set, as shown in FIG. 5, to a value which is obtained by multiplying a torque by a safety factor, wherein the torque is an ordinary transmission torque (dotted line) corresponding to a clutch pressure (hydraulic oil pressure in the starting clutch) which is the engaging pressure of the starting clutch 7, and the safety factor is one taking into consideration a deviation in a coefficient of friction of a clutch plate. A value of TQSCX corresponding to the clutch pressure at present time is searched in a table. The clutch pressure is controlled, at the initial time of the vehicle start-up, to such a hydraulic oil pressure as to eliminate or minimize an ineffective stroke of the starting clutch 7. After the forward/reverse switching mechanism 6 has geared in, the clutch pressure is increased to the hydraulic oil pressure which is at the time of the ordinary running.

After the searching for TQSCX has been finished, the program proceeds to step S4-2, where TQSCX is divided by a reduction ratio ISRATIO of the continuously variable transmission mechanism 5 at the time of engine stopping to thereby calculate TQBLTSCX. The program then proceeds to step S4-3, where a predetermined value TQISST is added to TQBLTSCX to calculate the belt transmission torque TQBLTSC. The predetermined value TQISST is a value which takes into consideration that torque equivalent to an inertia of the driven pulley 51 which is required to rotate the stationary driven pulley 51. For example, TQISST is set to a value corresponding to that load torque due to the inertia of the driven pulley 51 which operates on the belt 52 when, e.g., the rotational speed of the engine 1 is increased to 1000 rpm in 300 msec at a maximum reduction ratio (low ratio) of the continuously variable transmission mechanism 5.

Thereafter, at step S4-4, calculation is made of that belt transmission torque TQBLTNORM corresponding to the engine output torque which is obtained by the rotational speed NE and the negative suction pressure PB of the engine. At step S4-5, a discrimination is made as to whether TQBLTNORM has exceeded TQBLTSC or not. If a condition of TQBLTNORM≧TQBLTSC has been satisfied, the transmission torque TQDR of the drive pulley 50 is set at step 4-6 to TQBLTSC. If TQBLTNORM<TQBLTSC, TQDR is set at step S4-7 to TQBLTNORM.

Then, at step S4-8, a discrimination is made as to whether the rotational speed NDR of the drive pulley 50 is below a predetermined speed YNDR or not. The predetermined value YNDR is a value taking into consideration the following point. Namely, when the drive pulley 50 is at a low speed of rotation, the accuracy of detecting the rotational speed NDR of the drive pulley 50 and the rotational speed NDN of the driven pulley 51 becomes poor and, consequently, the reduction ratio RATIO (=NDR/NDN) of the continuously variable transmission 5 cannot be accurately calculated. The predetermined value YNDR is thus set to that lower limit value of NDR which can secure the accuracy of the reduction ratio. If NDR ≦YNDR, the transmission torque TQDN of the driven pulley 51 is set at step S4-9 to a value which is obtained by multiplying TQDR by the maximum reduction ratio YLOW. If NDR>YNDR, TQDN is set at step S4-10 to a value which is obtained by multiplying TQDR by the reduction ratio RATIO which is measured at that time.

Once TQDR and TQDN have been set as described above, calculation is made at step S4-11 of that pulley side-pressure PDR of the drive pulley 50 which corresponds to TQDR and that pulley side-pressure PDN of the driven pulley 51 which corresponds to TQDN. Hydraulic oil pressure commands of PDR, PDN are outputted for the first and second linear solenoid valves $15_1$, $15_2$.

According to the above-described control, at the initial time of vehicle start-up from the state of engine stopping, even if the negative suction pressure PB is small and the calculated value of the engine output wrongly becomes a large value, a discrimination is made at step S4-5 to the effect that the condition is TQBLTNORM≧TQBLTSC. TQDR is thus set to the belt transmission torque TQBLTSC which is defined by the transmission torque of the starting clutch 7. The pulley side-pressure is thus prevented from becoming excessive as compared with the actual belt transmission torque. Further, if the negative suction pressure PB has reached a region capable of normal detection and then if a determination is made that the condition of TQBLTNORM<TQBLTSC has been satisfied, TQDR is set to a belt transmission torque TQBLTNORM to be defined by the engine output torque. Therefore, even if the transmission torque of the starting clutch 7 is set to a higher value by multiplying the safety factor, the pulley side-pressure can still be adequately controlled.

In the above-described embodiment, the starting clutch 7 is constituted by a hydraulic clutch. The present invention can, however, be similarly applicable to an embodiment in which the starting clutch 7 is constituted by another clutch such as an electromagnetic clutch or the like, instead of the hydraulic clutch.

As can be seen from the above-described explanations, according to the present invention, the pulley side-pressure can be prevented from becoming excessive at the time of vehicle start-up from the state of engine stopping. The durability of the pulleys and the belt can thus be improved and the specific fuel consumption is also improved as a result of reduction in the friction loss.

It is readily apparent that the above-described apparatus for controlling a pulley side-pressures of a continuously variable transmission mechanism meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for controlling a pulley side-pressure to be applied to a drive pulley and a driven pulley of a belt type continuously variable transmission mechanism which is provided, in series with a starting clutch, in a transmission of a vehicle having a function of stopping engine idling so that an engine is automatically stopped under given conditions when the vehicle is at a standstill, said apparatus comprising:

means for calculating a first belt transmission torque which corresponds to that output torque of the engine which is obtained from a rotational speed and a negative suction pressure of the engine;

means for calculating a second belt transmission torque which corresponds to that transmission torque of the starting clutch which is obtained from an engaging force of the starting clutch;

means for comparing the first belt transmission torque and the second belt transmission torque; and means for controlling a pulley side-pressure based on whichever is smaller between the first and second belt transmission torques at a time of vehicle start-up from a state of engine stopping.

2. The apparatus according to claim 1, wherein that transmission torque of the starting clutch which is obtained from the engaging force of the starting clutch is set to a value obtained by multiplying an ordinary transmission torque of the starting clutch by a predetermined safety factor, and wherein a belt transmission torque corresponding to thus obtained transmission torque is defined as the second belt transmission torque.

3. The apparatus according to claim 1, wherein the starting clutch is provided on an output side of the belt type continuously variable transmission, wherein the second belt transmission torque is obtained by adding a first value and a second value together, said first value being that transmission torque of the starting clutch which is obtained from the engaging force of the starting clutch as divided by a reduction ratio of the belt type continuously variable transmission, said second value being that torque corresponding to an inertia of the driven pulley which is required to rotate the stationary driven pulley.

4. The apparatus according to claim 2, wherein the starting clutch is provided on an output side of the belt type continuously variable transmission, wherein the second belt transmission torque is obtained by adding a first value and a second value together, said first value being that transmission torque of the starting clutch which is obtained from the engaging force of the starting clutch as divided by a reduction ratio of the belt type continuously variable transmission, said second value being that torque corresponding to an inertia of the driven pulley which is required to rotate the stationary driven pulley.

* * * * *